(12) United States Patent
Houldsworth (10) Patent No.: US 6,502,110 B1
(45) Date of Patent: Dec. 31, 2002

(54) MEMORY RECLAMATION METHOD AND APPARATUS

(75) Inventor: Richard J. Houldsworth, Horley (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/537,821

(22) Filed: Mar. 29, 2000

(30) Foreign Application Priority Data

Mar. 31, 1999 (GB) .............................................. 9907278

(51) Int. Cl.$^7$ .............................................. G06F 17/30
(52) U.S. Cl. ...................................... 707/206
(58) Field of Search ........................... 707/206, 103 R; 709/104; 711/6

(56) References Cited

U.S. PATENT DOCUMENTS 4,775,932 A * 10/1988 Oxley et al. ............... 707/206
5,241,673 A * 8/1993 Schelvis .................. 707/103 R

OTHER PUBLICATIONS

Jones et al., "Garbage Collection: Algorithms for Automatic Dynamic Memory Management", pp 1–18.
Paul R. Wilson, "Uniprocessor Garbage Collection Techniques", Proc. Of International Workshop on Memory Management, St. Malo, France, Sep. 1992.

* cited by examiner

*Primary Examiner*—Diane D. Mizrahi
*Assistant Examiner*—Apu M Mofiz
(74) *Attorney, Agent, or Firm*—Gregory L. Thorne (57) ABSTRACT

A method and apparatus for reclaiming memory space allocated to data structures comprising data objects linked by identifying pointers. The memory allocated to data objects is reclaimed using two systems. In the first system (240), the data structures are traversed to identify those objects to which no references are made by the pointers of other objects, and the memory allocated to those objects to which no references are made is reclaimed. In the second system (210), objects which are not descendants of root objects are determined and the memory allocated to those objects is reclaimed. Cycles of the first system are interleaved with cycles of the second system.

17 Claims, 8 Drawing Sheets

MEMORY RECLAMATION METHOD AND APPARATUS

BACKGROUND OF THE INVENTION

The present invention relates to a memory reclamation method and apparatus and in particular, though not exclusively, to such method and apparatus in which repeated sweeps of memory using alternative algorithms are made.

Garbage collection is the automated reclamation of system memory space after its last use by a programme. A number of examples of garbage collecting techniques are discussed in "Garbage Collection—Algorithms for Automatic Dynamic Memory Management" by R. Jones et al, pub. John Wiley & Sons 1996, ISBN 0-471-94148-4, at pages 1 to 18, and "Uniprocessor Garbage Collection Techniques" by P. R. Wilson, Proceedings of the 1992 International Workshop on Memory Management, St. Malo, France, September 1992. Whilst the storage requirements of many computer programs are simple and predictable, with memory allocation and recovery being handled by the programmer or a compiler, there is a trend toward functional languages having more complex patterns of execution such that the lifetimes of particular data structures can no longer be determined prior to run-time and hence automated reclamation of this storage, as the program runs, is essential.

A common feature of a number of garbage collection reclamation techniques, as described in the above-mentioned Wilson reference, is incrementally traversing the data structure formed by referencing pointers carried by separately stored data objects. The technique involves first marking all stored objects that are still reachable by other stored objects or from external locations by tracing a path or paths through the pointers linking data objects.

This may be followed by sweeping or compacting the memory—that is to say examining every object stored in the memory to determine the unmarked objects whose space may then be reclaimed.

Each garbage collection algorithm has its own particular strengths and weaknesses. For example a mark-sweep garbage collector is able to detect all unused objects and reclaim the memory occupied by them in a single mark-sweep pass through the memory heap. However, garbage cannot be identified for certain until all used objects have been marked. In contrast, a reference counting garbage collector is able to detect unused objects and immediately reclaim memory occupied by them. Unfortunately, reference counting cannot, by itself, identify unused circular loops of objects, where the tail of a list is linked to the head.

Furthermore, some garbage collected languages and environments such as Java (®Sun Microsystems Inc.), Modula-3 and Cedar support the is concept of finalisation, which it is necessary that garbage collection algorithms cater for. Stored data objects created by a program process may have an associated finaliser procedure which is to be executed after the object is detected as unmarked and nominally becomes available for garbage collection but before the memory occupied by the data object is reclaimed. The purpose of this feature is to allow an object to clean up any other system resources the object has claimed before it is destroyed. For example, the finaliser for a Java File Object would close all the system file handles held by the object.

However, a finaliser is just a special type of procedure associated with an object with all the power of the programming language available to it. The finaliser procedure can therefore access and manipulate all data objects accessible from the object being finalised. Therefore, all objects accessible by a finaliser, such as descendant objects accessible from referencing pointers held by the data object, must be explicitly excluded from garbage collection. Furthermore, it is possible for the finaliser method to resurrect any such objects accessible by a finaliser, including the object being finalised itself, by making the object accessible to the program process again. Consequently, a garbage collection procedure cannot delete any objects that are accessible by a finalisable object until its finaliser has executed and the accessibility of the objects has been re-evaluated. In Java and other languages, the possibility of an object repeatedly resurrecting itself is typically removed by stating that the finaliser for each instance is executed only once. This control on finalisation will be assumed herein.

In PC's or workstations, the extra processing and memory load to support finalisation is not usually a problem due to the amount of memory typically available in a PC, although the support will, of course, affect the overall efficiency. In low-memory environments such as set-top boxes, however, support for finalisers can cause problems and even a concurrent or incremental garbage collector may have to halt the program until it has executed some or all of the outstanding finalisers and reclaimed any memory used by them.

SUMMARY OF THE INVENTION

According to a first aspect of the present invention, there is provided a method of reclaiming memory space allocated to data structures comprising data objects linked by identifying pointers, in which the memory allocated to data objects is reclaimed using two systems: a first system, by which the data structure is traversed to identify those objects to which no references are made by the pointers of other objects, and reclaiming the memory allocated to those objects to which no references are made; and a second system, which determines which objects are not descendants of root objects and reclaiming the memory allocated to those objects, wherein cycles of the first system are interleaved with cycles of the second system.

The second system may determine which objects are descendants of root objects from a mark associated with each object, which mark has been set by the first system if the object is a descendant of a root object.

An advantage of the present invention is that one traversal of the heap gives information required for memory reclamation using both systems.

The cycles of the first system may reclaim the memory allocated to a group of data objects the pointers of which reference each other but none of which are referred to by the pointer of a root object.

The interleaving of first and second systems may be performed according to predetermined criteria including: cycles of the first system may be performed until no unreferenced objects are found, followed by a cycle of the second system; a cycle of the first system may be interleaved between cycles of the second system; a first number of cycles of the first system are interleaved between a second number of cycles of the second system. A global indicator may dictate from which system the next memory reclamation cycle will be derived.

The memory space may be traversed in a first direction during even numbered cycles and traversed in a second, alternate, direction during odd numbered cycles. A first mark may be associated with objects referenced by pointers of other objects found during the traversal in the first direction. A second mark may be associated with objects referenced by pointers of other objects found during the traversal in the second direction. An object found to be unreferenced by pointers of other objects traversed in one direction and not having the mark from a prior traversal in the alternate direction may be deleted.

Changes to pointers referencing objects may be monitored and the first system may only traverse a data structure to identify those objects to which no references are made by the pointers of other objects when a change to a pointer referencing a constituent object of the data structure occurs. If a change to a pointer which uniquely references an object occurs, the uniquely referenced object may be immediately deleted.

According to another aspect of the present invention, there is provided a data processing apparatus comprising a data processor coupled with a random access memory containing data structures comprising data objects linked by identifying pointers, the processor being configured to provide the following for operating on the stored plurality of data objects: first means for traversing the data structures to identify those objects to which no references are made by the pointers of other objects, and for reclaiming the memory allocated to those objects to which no references are made; and second means for determining which objects are not descendants of root objects and for reclaiming the memory allocated to those objects, wherein cycles of the first means are interleaved with cycles of the second means.

In the present invention, repeated sweeps of heap memory are performed using alternating complementary garbage collection methods to improve the efficiency of garbage collection, utilising the benefits of each method whilst avoiding their inherent weaknesses. Advantageously, the garbage collection method of the present invention identifies finaliser-accessible objects.

More advantageously, finalisable objects identified are topologically ordered and executed to avoid having to repeatedly process a finalisable object and its descendants which are descendants of another finalisable object.

Furthermore, the method of the present invention is composed of a number of simple steps, thereby permitting fine-grained incremental implementations of the garbage collector.

BRIEF DESCRIPTION OF THE DRAWINGS

The present invention will now be described, by way of example only, with reference to the accompanying drawings in which.

DETAILED DESCRIPTION OF THE PREFERRED EMBODIMENTS

Figure 1:
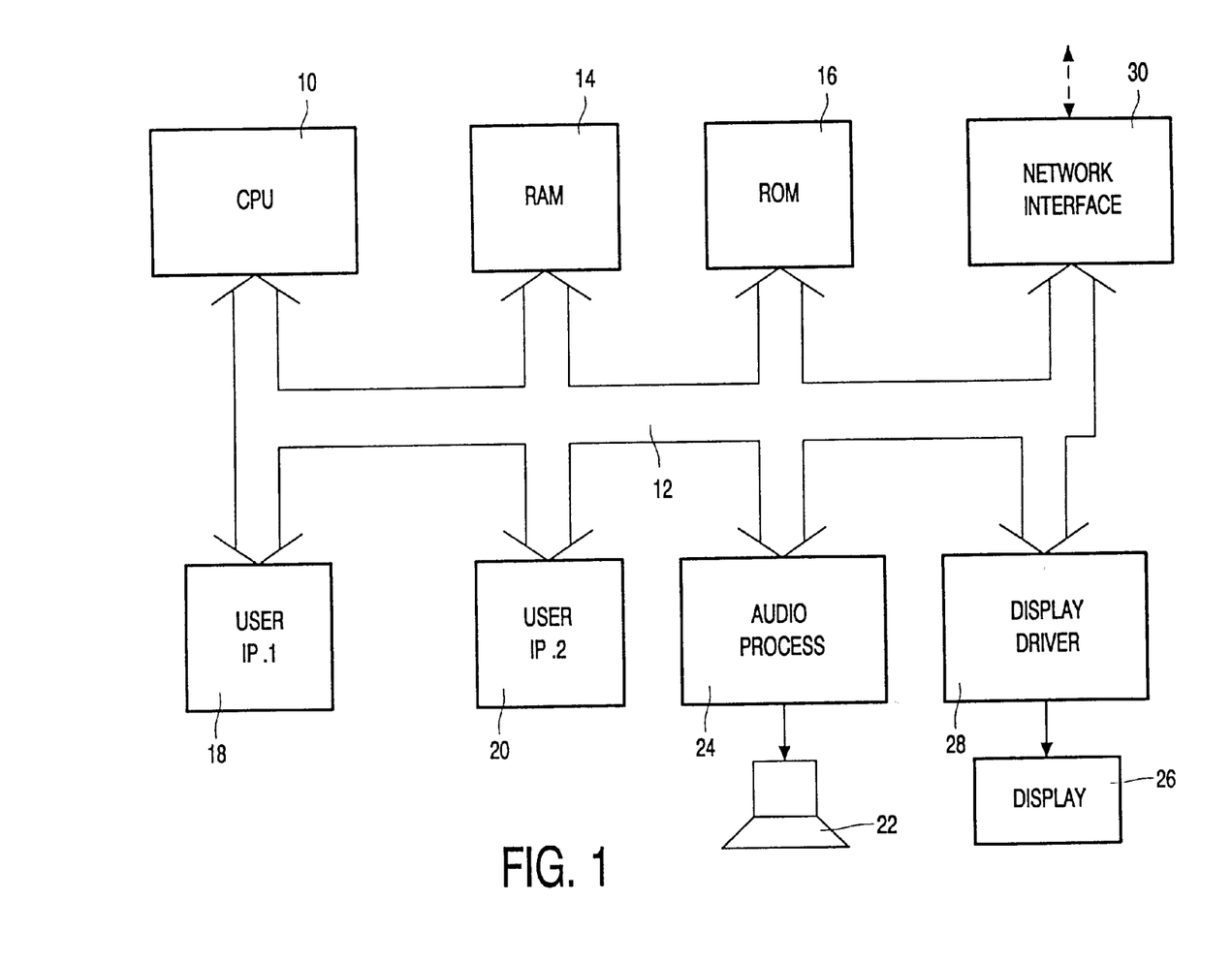
FIG. 1 is a block diagram of a data processing system suitable to embody the present invention.

FIG. 1 represents a data processing system, such as a personal computer, which acts as host for a number of software utilities which may, for example, configure the system as a browser for data defining a virtual environment. The system comprises a central processing unit (CPU) 10 coupled via an address and data bus 12 to random-access (RAM) and read-only (ROM) memories 14, 16. These memories may be comprised of one or several integrated circuit devices and may be augmented by a system hard-disk as well as means to read from additional (removable) memory devices, such as a CD-ROM. Also coupled to the CPU 10 via bus 12 are first and second user input devices 18, 20 which may suitably comprise a keyboard and a cursor control and selection device such as a mouse or trackball. Audio output from the system is via one or more speakers 22 driven by an audio processing stage 24. Video output from the system is presented on display screen 26 driven by display driver stage 28 under control of the CPU 10. A further source of data for the system is via on-line link to remote sites, for example via the Internet, to which end the system is provided with a network interface 30 coupled to the bus 12.

The present invention is particularly embodied in memory management for a working area of the RAM 14 under control of the CPU 10; a controlling program for this may initially be held in ROM 16 and loaded up with the operating system on power-up. The following examples are compliant with concurrent garbage collection and memory management techniques in the Java (® Sun Microsystems Inc) virtual machine and the terminology should be construed accordingly: it will be recognised however that the present invention is not restricted to Java-compliant systems, to concurrent (or incremental) garbage collection, nor to purely virtual memory management.

Figure 2:
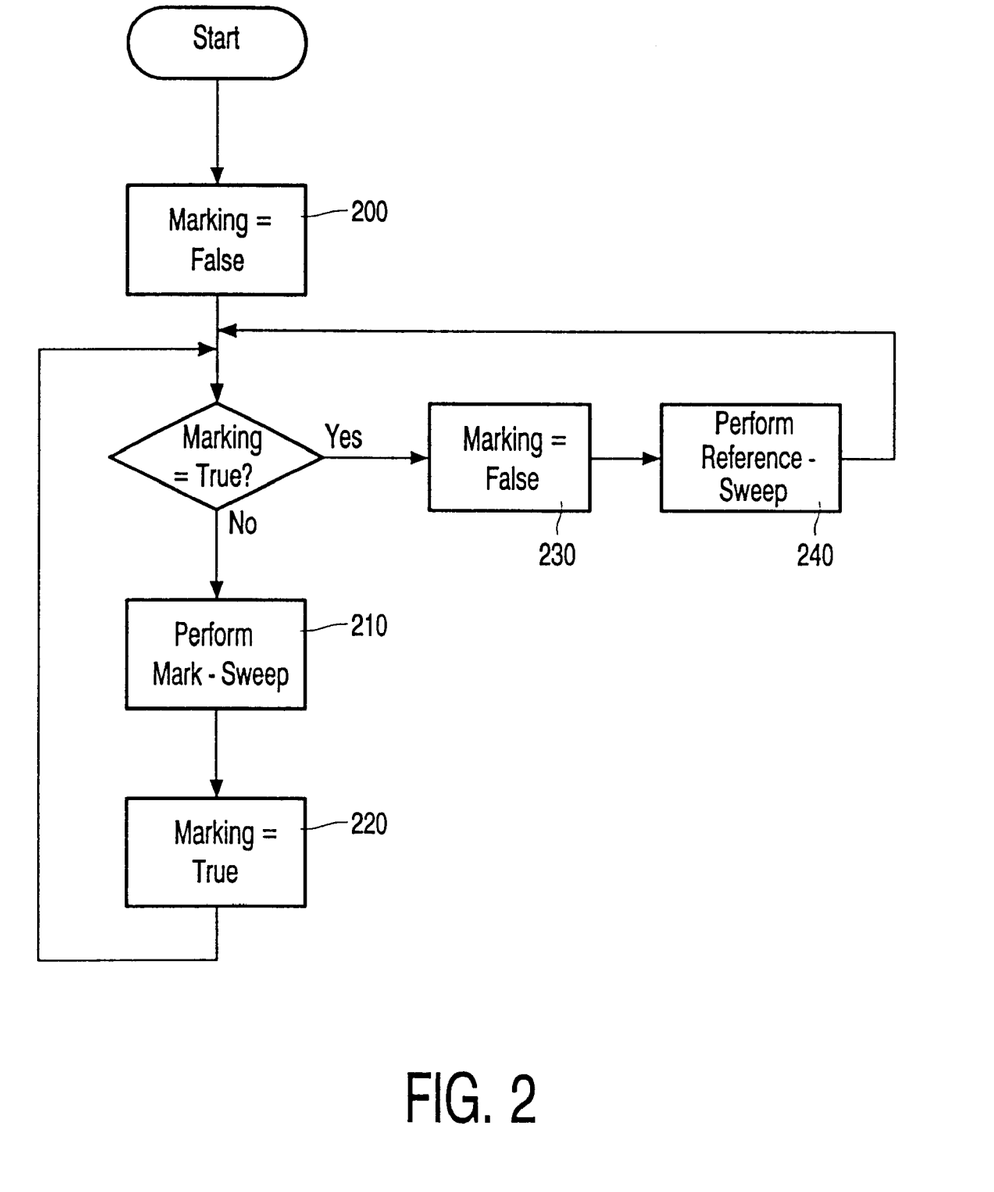
FIG. 2 is a flow chart of the method of the present invention.

FIG. 2 is a flow chart of a memory reclamation method according to the present invention. The method has two alternately run sweeping systems operating on a memory heap in a continuous loop. The first system performs a mark-sweep for detecting and reclaiming memory from unused circular referenced objects (such as a list where the tail is arranged to point at the head). The second system performs a reference-sweep for detecting and reclaiming memory from objects that are not descendants of root objects accessible by programs. A global variable Marking is used to control which of the two systems should be executed next. Each object has a number of status fields, as shown in the following table;

| Field | Possible States |
| --- | --- |
| Reference | Unreffed - No references to object found<br>Reffed - One or more references to object found |
| Mark | Unmarked - Object has not held a mark token in this cycle<br>Mark - Object currently holds a mark token<br>Marked - Object has previously held a mark token in this cycle |
| Finaliser | Finalisable - Object has an unexecuted finaliser<br>Finalised - Object has an executed finaliser<br>No_Finaliser - Object has no finaliser |
| Root | True - Object is permanent & should never be deleted<br>False - Object is not permanent |

A newly created object is set Reference=Reffed and Mark=Marked. The settings of status fields Finaliser and Root will depend on the object.

On starting, Marking is set to false in step 200. The continuous loop is then entered which repeats the following steps; if Marking is false, a mark-sweep is performed in step 210 and Marking is then set to True in step 220, otherwise, Marking is set to false in step 230 and a reference-sweep is performed in step 240.

Figure 3:
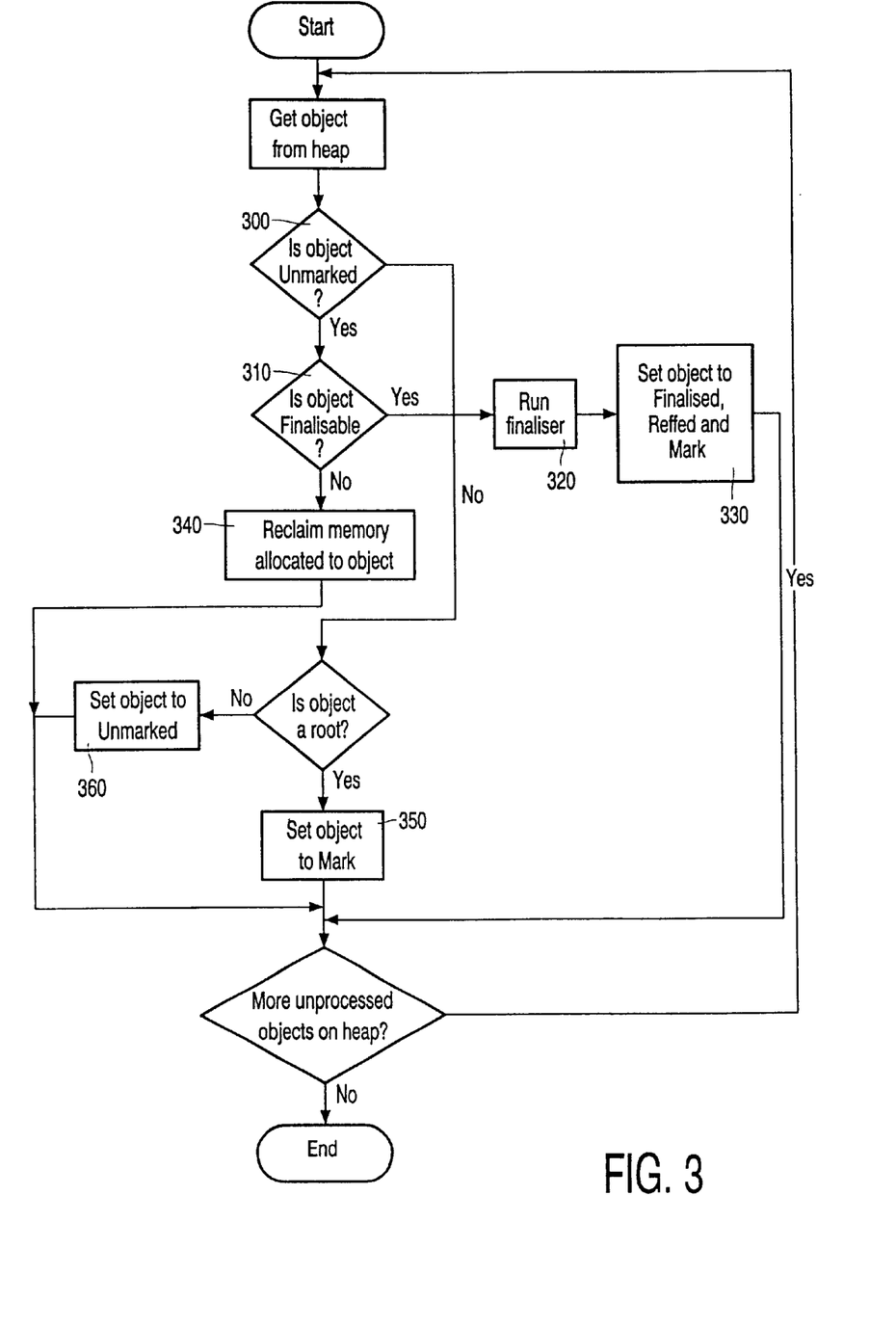
FIG. 3 is a flow chart of selected steps of the method of the present invention shown in more detail.

FIG. 3 is a flow chart of the mark-sweep performed in step 210. Each object in the heap is checked to determine if its Mark field is set to Unmarked in step 300. If so, its Finaliser field is checked in step 310. Finalisable objects have their Finalisers executed in step 320 and are set to Finalised, Reffed and Marked in step 330. The memory allocated to all other unmarked objects is reclaimed in step 340. If an object is not Unmarked, a root object has the Mark field set to Mark in step 350 whilst non-root objects have the Mark field set to Unmarked in step 360.

Figure 4A:
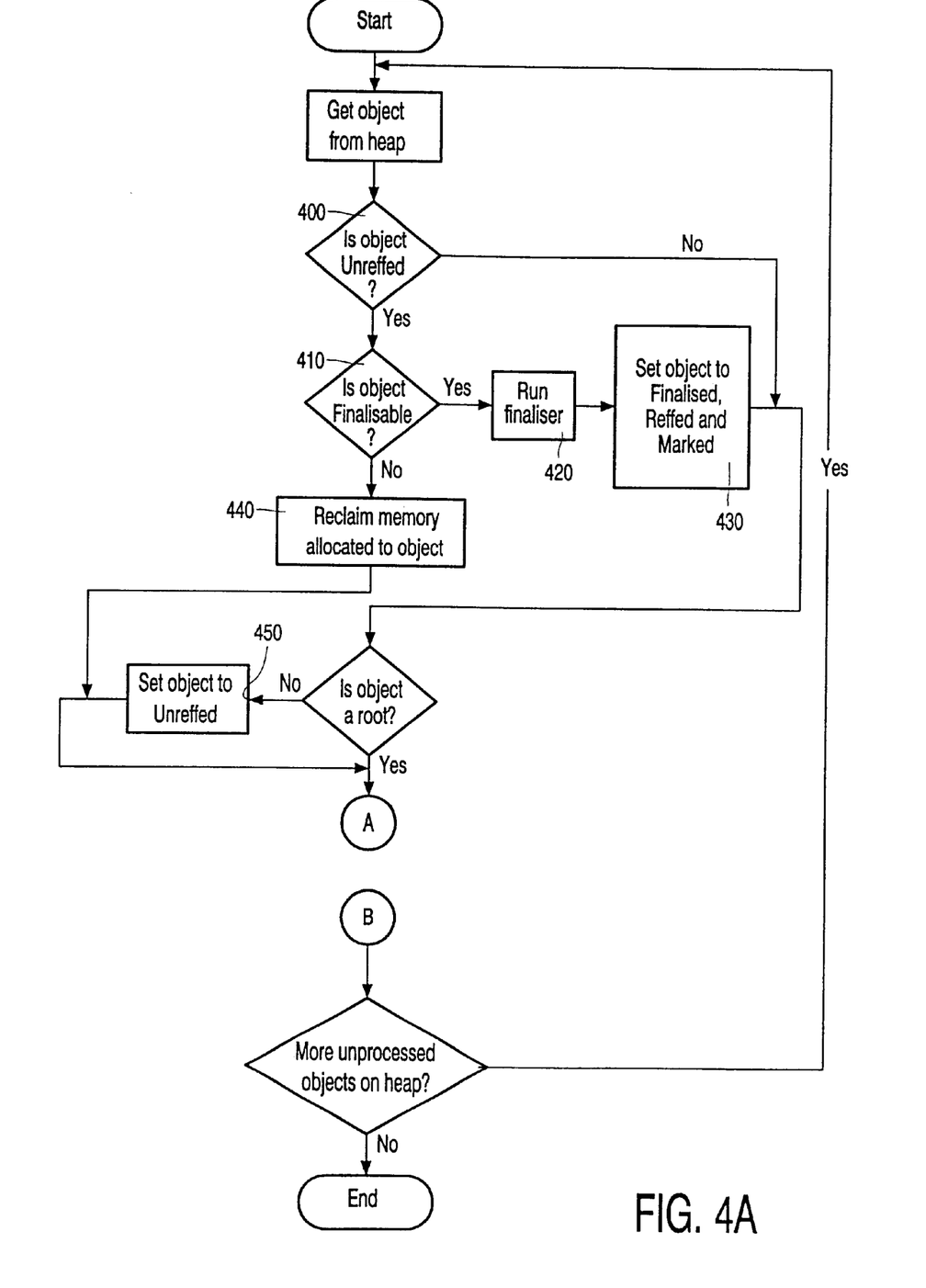
FIG. 4 is a flow chart of other selected steps of the method of the present invention shown in more detail.
Figure 4B:
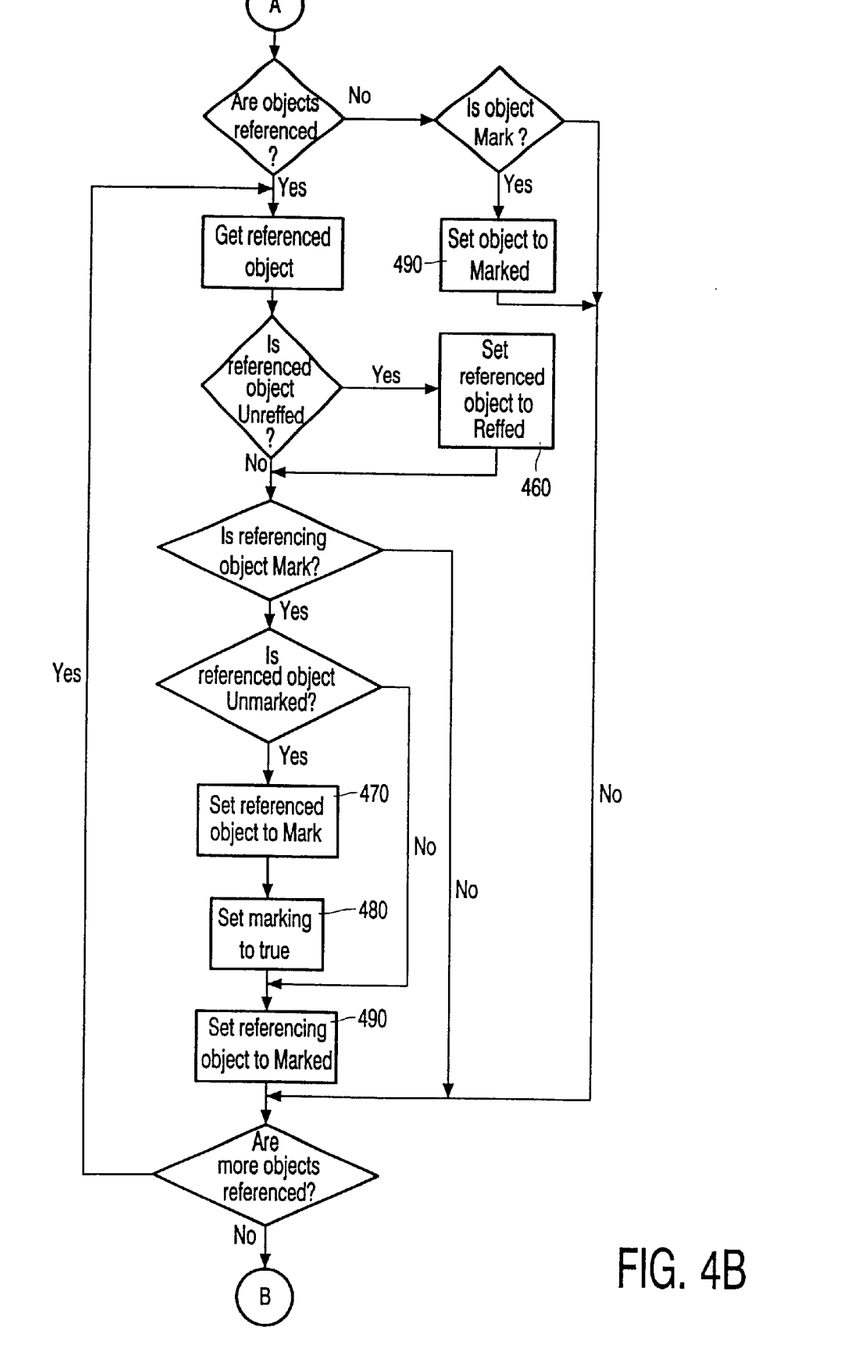

FIG. 4 is a flow chart of the reference-sweep performed in step 240. Each object in the heap is checked to determine if its Reference field is set to Unreffed in step 400. If so, its Finaliser field is checked in step 410. Finalisable objects have their Finalisers executed in step 420 and are set to Finalised, Reffed and Marked in step 430. The memory allocated to all other unmarked objects is reclaimed in step 440. If an object is not Unreffed, a non-root object has its Reference field set to Unreffed in step 450. Steps 460–480 are then performed on each object referenced by the object currently being processed. In step 460, the Reference field of the object referenced is set to Reffed. If the Mark field of the referring object is set to Mark and the Mark field of the object referenced is set to Unmarked, the Mark field of the object referenced is set to Mark in step 470 and the global variable Marking is set to true in step 480. If the Mark field of the object being processed is set to Mark, this is changed to Marked in step 490.

Figure 5:
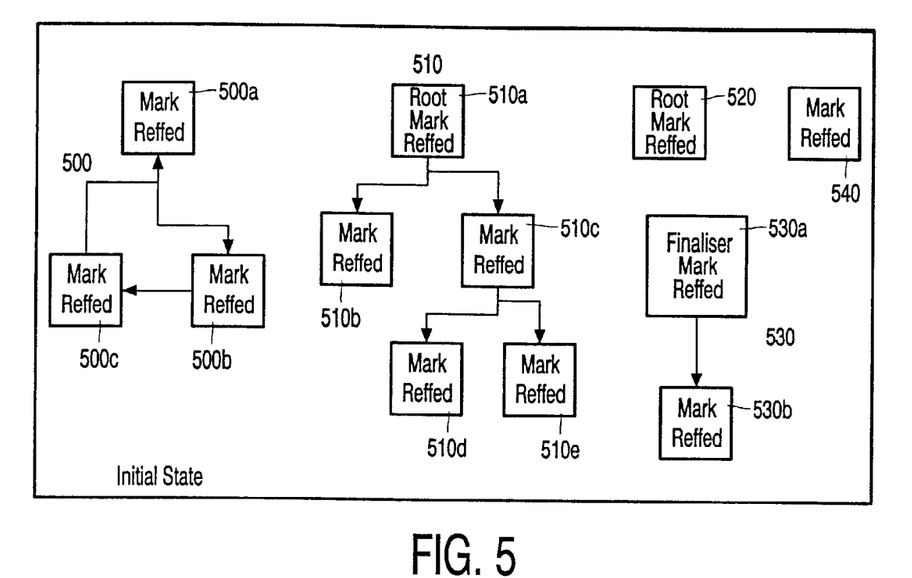
FIGS. 5 to 10 are block diagrams representing the processing of data structures according to the method of the present invention.

FIGS. 5 to 10 show the processing of data structures comprising a number of data objects according to the method of FIGS. 2 to 4. FIG. 5 shows data structures 500, 510, 520, 530 and 540 in their initial states (Marked and Reffed).

Figure 6:
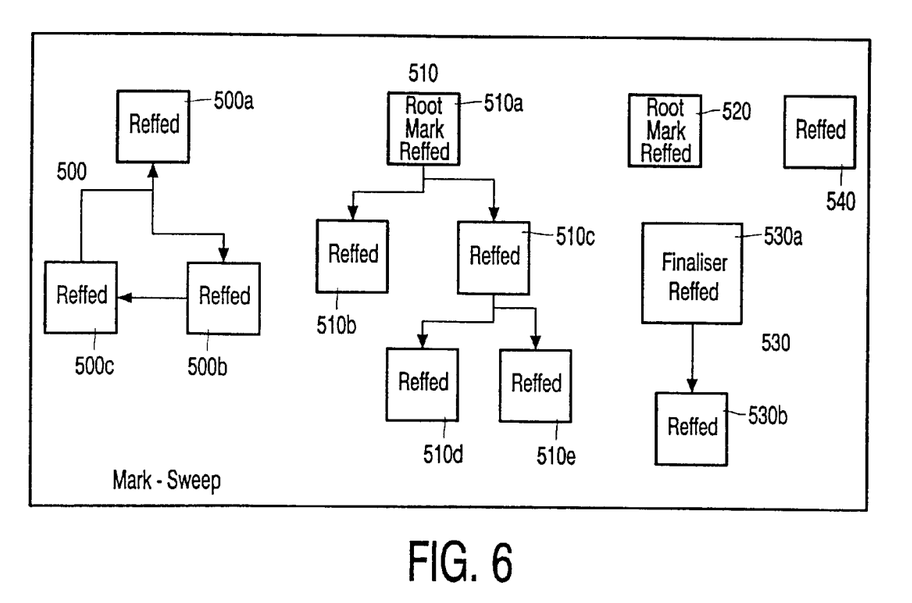

FIG. 6 shows the data structures after the mark-sweep cycle of the system. The mark state of objects 500, 530 and 540 is changed to Unmarked. As they are root objects, the mark state of data objects 510a and 520 is changed to Mark. The mark state of the remaining objects 510b–510e is changed to Unmarked.

Figure 7:
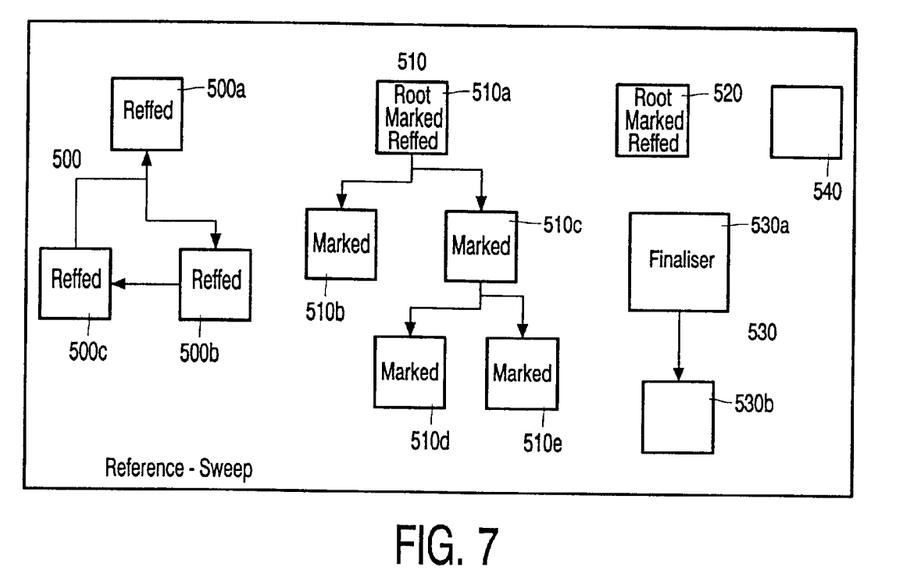

FIG. 7 shows the data structures after the reference-sweep cycle of the system. The reference state of data object 500a–500c is changed to Unreffed (step 450) and then back to Reffed (step 460) again as each data object is referenced in the circular loop. The referenced state of data objects 510b–510e is changed to Unreffed and the mark state of data objects 510a–510e is changed from Unmarked, through Mark, to Marked as the Mark token propagates down the tree 510. This propagation could take more than one reference-sweep, depending on the ordering of data object 510a–510e in memory. The changing of mark status also changes the global variable Marking to true. Data object 520 is Marked and Reffed as it is a root data object. The state of data objects 530a and 540 is changed to Unreffed and Unmarked as neither are linked to a root data object and therefore must be garbage.

Figure 8:
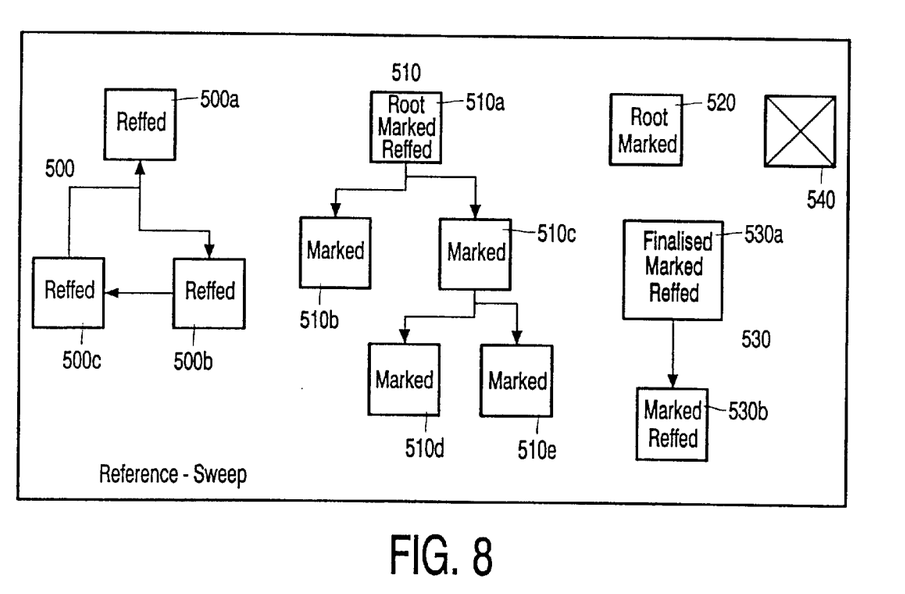

As Marking was set to true, another reference-sweep is performed in FIG. 8. Again, the reference state of data object 500a–500c is changed to Unreffed and then back to Reffed again as each data object is referenced in the circular loop. The state of data objects 510a–510e and 520 is unchanged after this sweep. Data object 540 is detected as Unmarked and, as it has no finaliser, the memory allocated to the data object is reclaimed. Data object 530 is also detected as Unmarked. However, the object 530a has a finaliser which is therefore executed and the status of the object is set to Marked, Reffed and Finalised. Due to the Reffed setting, object 530a and 530b are not reclaimed during this cycle.

Figure 9:
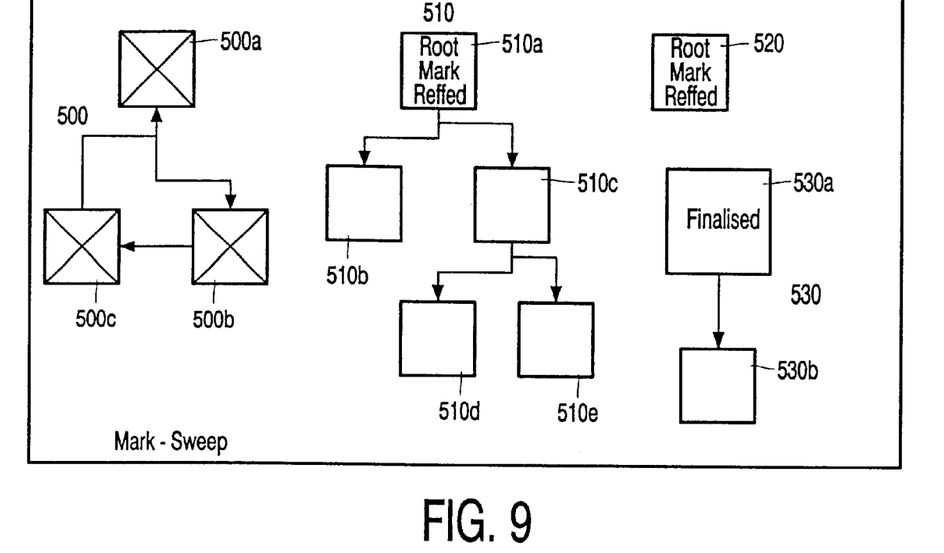

The next cycle is a mark-sweep. The status of the data structures after this is shown in FIG. 9. As none of the data objects 500a–500c are marked, they are reclaimed. The marking status of data objects 510a and 520 is reset to Mark and the marking status of data object 510b–510e and 530a is set to Unmarked. Data object 530b is reclaimed as it is Unmarked.

Figure 10:
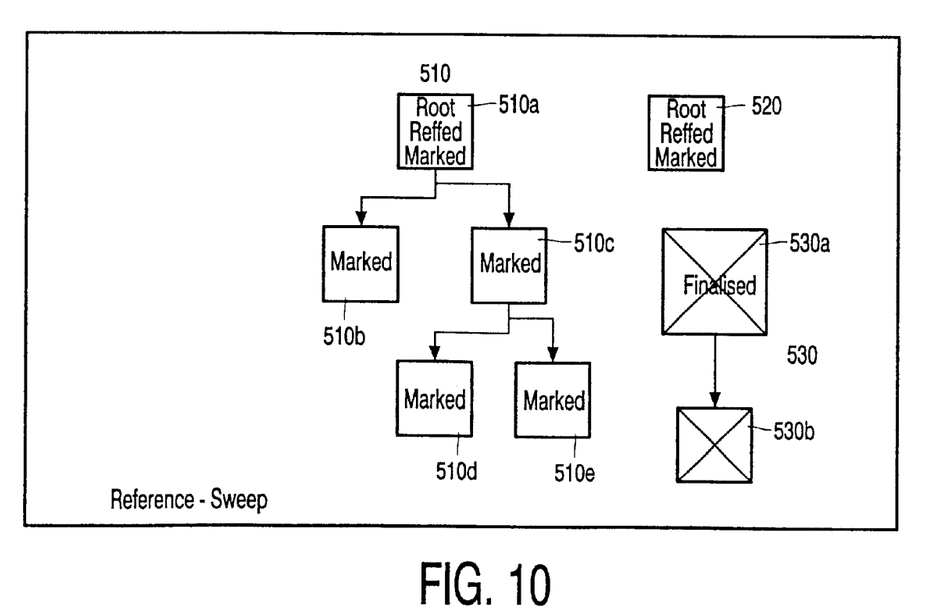

During the reference-sweep cycle shown in FIG. 10, data object 530a is reclaimed.

As an alternative to immediately running the finaliser of a finalisable object, thereby making it safe to be reclaimed immediately afterwards, it may be preferable to queue the execution of finalisers. In order to prevent finalisable objects and their descendants from being reclaimed, the finalisable object could be made a root object for the duration of the queuing and execution of the finaliser.

In order to improve the efficiency of the method of the present invention when processing long lists of linked data objects, the direction of the sweep cycles through the heap could be alternated. Two further reference bits '<' and '>' would be maintained for each data object. The bits represent a reference count of references from each direction in the heap. The '<' bit is marked on a sweep up the heap and the '>' is marked on the sweep down the heap that subsequently follows. An object may be safely reclaimed immediately if both '<' and '>' are not set. This is because when an object is reached by the sweep, references from that direction must have been checked. The count from the other direction was obtained on the previous sweep, and likewise for any references from that side of the heap. Therefore there can be no other references and the object can be reclaimed. In the worst case, a list where elements are totally interleaved would still be reclaimed in half as many cycles as a unidirectional sweep.

Whilst the in above description reference counting is performed during the reference-sweep cycle, the reference counting could alternatively, or in addition, be performed during the mark-sweep cycle. This would mean in the above example that objects 540 and 530a are reclaimed one cycle earlier.

It has been assumed during this description that a mark state is propagated through a data structure in a single cycle. However, the method and apparatus of the present invention are equally applicable to situations where a mark is propagated through a data structure during a number of cycles.

Repetitive Unreffed-Reffed transitions, such as in the above illustrated case of the cyclic list data structure 500, could be avoided by extending the write barrier (normally used to prevent a program process changing a reference due to be followed in the sweep) so that changes to objects between sweeps are noted. Objects would remain in the Reffed state unless a change to the object occurs. An object goes into the 'Changed' state when a reference to the object is altered. The 'Changed' state can be regarded as an intermediate reference state. On a reference sweep, an object with the 'Changed' state is modified to Unreffed.

To reduce the number of reference sweeps needed to recycle memory, the reference state could be extended to include;

| State | |
|---|---|
| Unreffed | Reference count = 0 |
| Unique | Reference count = 1 |
| Shared | Reference count >= 1 |
| Changed | Reference count = unknown |

The write barrier must now be extended to include the transition from Shared to Changed states when a reference to the object is deleted, and the transition from Unique to Unreffed states when the reference to uniquely accessed data is lost. The data object can be deleted during the write barrier operation, without having to wait for the next sweep to pass.

The number of reference sweeps needed to conclude a mark trace is equal to the maximum span from a root to a live item of data. For structures such as linked lists, this span length is likely to be very long. An adaptive approach could allow a deeper trace down through objects when the amount of work performed on each sweep is low. The number of mark token propagation operations on the previous sweep could be used as a factor to estimate the depth of scanning to perform on this sweep.

From reading the present disclosure, other modifications will be apparent to persons skilled in the art. Such modifications may involve other features which are already known in the design, manufacture and use of data processing and/or data network access apparatus and devices and component parts thereof and which may be used instead of or in addition to features already described herein.

What is claimed is:

1. A method of reclaiming memory space allocated to data structures comprising data objects linked by identifying pointers, in which the memory allocated to data objects is reclaimed using two systems:
   a first system, by which the data structures are traversed to identify those objects to which no references are made by the pointers of other objects, and reclaiming the memory allocated to those objects to which no references are made; and
   a second system, which determines which objects are not descendants of root objects and reclaiming the memory allocated to those objects, wherein cycles of the first system are interleaved with cycles of the second system, and wherein the memory space is traversed in a first direction during even numbered cycles and is traversed in a second, alternate, direction during odd numbered cycles.

2. A method as claimed in claim 1, wherein the second system determines which objects are descendants of root objects from a mark associated with each object, which mark has been set by the first system if the object is a descendant of a root object.

3. A method as claimed in claim 1, wherein the cycles of the first system reclaim the memory allocated to a group of data objects the pointers of which reference each other but none of which are referred to by the pointer of a root object.

4. A method as claimed in claim 1, wherein the interleaving of first and second systems is performed according to predetermined criteria.

5. A method as claimed in claim 4, wherein the predetermined criteria perform cycles of the first system until no unreferenced objects are found, followed by a cycle of the second system.

6. A method as claimed in claim 4, wherein a cycle of the first system is interleaved between cycles of the second system.

7. A method as claimed in claim 4, wherein a first number of cycles of the first system are interleaved between a second number of cycles of the second system.

8. A method as claimed in claim 7, wherein a first mark is associated with objects referenced by pointers of other objects found during the traversal in the first direction.

9. A method as claimed in claim 8, wherein a second mark is associated with objects referenced by pointers of other objects found during the traversal in the second direction.

10. A method as claimed in claim 9, wherein an object found to be unreferenced by pointers of other objects traversed in one direction and not having the mark from a prior traversal in the alternate direction is deleted.

11. A data processing apparatus comprising a data processor coupled with a random access memory containing data structures comprising data objects linked by identifying pointers, the processor being configured to provide the following for operating on the stored plurality of data objects:
   first means for traversing the data structures to identify those objects to which no references are made by the pointers of other objects, and for reclaiming the memory allocated to those objects to which no references are made; and
   second means for determining which objects are not descendants of root objects and for reclaiming the memory allocated to those objects, wherein cycles of the first means are interleaved with cycles of the second means, and wherein the memory space is traversed in a first direction during even numbered cycles and is traversed in a second, alternate, direction during odd numbered cycles.

12. A data processing apparatus as claimed in claim 11, wherein the second means determines which objects are descendants of root objects from a mark associated with each object, which mark has been set by the first system if the object is a descendant of a root object.

13. A data processing apparatus as claimed in claim 11, comprising means for associating a first mark with objects referenced by pointers of other objects found during the traversal in the first direction.

14. A data processing apparatus as claimed in claim 13, comprising means for associating a second mark with objects referenced by pointers of other objects found during the traversal in the second direction.

15. A data processing apparatus as claimed in claim 14, further comprising means for deleting an object found to be unreferenced by pointers of other objects traversed in one direction and not having the mark from a prior traversal in the alternate direction.

16. A data processing apparatus as claimed in claim 11, comprising means for monitoring changes to pointers referencing objects, wherein the first means only traverses a data structure to identify those objects to which no references are made by the pointers of other objects when a change to a pointer referencing a constituent object of the data structure occurs.

17. A data processing apparatus as claimed in claim 16, comprising means for deleting a uniquely referenced object if a change to a pointer which uniquely references the object occurs.

* * * * *